Sept. 17, 1940.   R. W. WILLIAMS   2,215,282
DUST FILTER
Filed Dec. 6, 1939   2 Sheets-Sheet 2
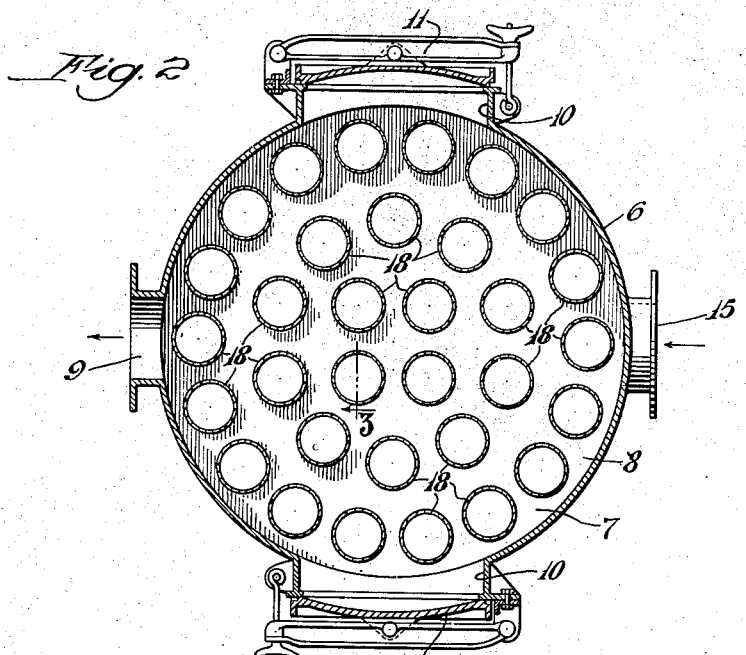
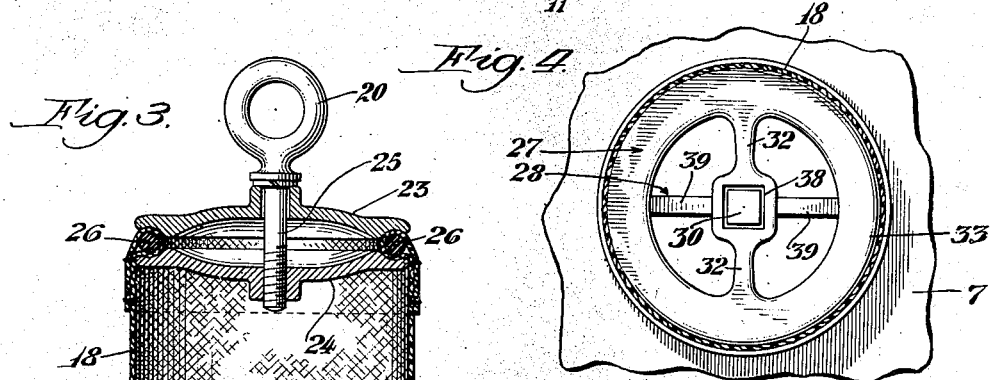
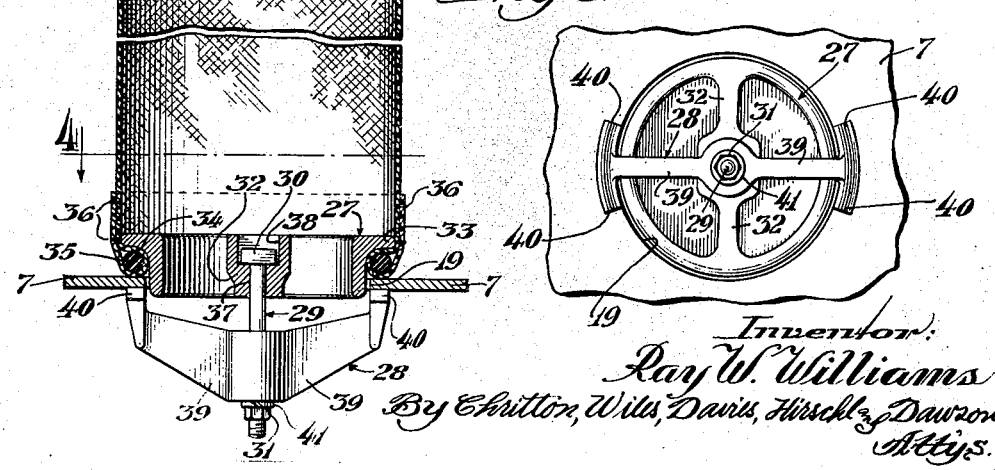
Inventor:
Ray W. Williams
By Chitton, Wiles, Davis, Hirschl & Dawson
Attys.

Patented Sept. 17, 1940

2,215,282

UNITED STATES PATENT OFFICE 2,215,282

DUST FILTER

Ray W. Williams, Blue Island, Ill., assignor to United Conveyor Corporation, Chicago, Ill., a corporation of Illinois Application December 6, 1939, Serial No. 307,903

6 Claims. (Cl. 183—51)

My invention relates more particularly to dust filters of the type comprising a shell containing groups of porous bag filters commonly provided of tubular form disposed in vertical position and into which the dust-laden air flows, depositing its contained dust in the bags, the air, freed of the dust, escaping through the walls of the bags into a chamber provided by the shell and in which the bags extend, the dust deposited in the bags being removed therefrom in any suitable way—in the case of a vertical filter, through the lower ends of the bags into a hopper—as for example by shaking the bags.

It is desirable in structures of this character to provide a large number of the bags in closely grouped relation in order that a filter of a given size shall have the maximum capacity with resultant relatively low cost of manufacture.

As structures of this character have hitherto been provided the bags have been secured in place in such manner as to necessitate a workman entering the chamber in which they are located, to disconnect such of the bags as may require, by impairment, removal and replacement or substitution, this condition not only rendering the operation of removing the bags a tedious and difficult one, but requiring, from a practical standpoint, the spacing of the bags in the filter, to a much greater degree than necessary for the successful operation of the filter and its manufacture at the least cost.

My objects generally stated are to provide improvements in bag-filter-apparatus to the end that they may be constructed at less cost, than such filters as hitherto provided, and that the operation of removing an impaired filter bag and replacing it, or making a substitution therefor, may be easily and quickly performed; to provide for the close spacing of the filter bags without complicating the operations of removal and replacement or substitution; to insure air and dust-proof joints between the bags and the structure defining the course through which the dust-laden air is conducted to the bags; and other objects as will be manifest from the following description.

Referring to the accompanying drawings:

Figure 2 is a plan sectional view taken at the line 2 on Fig. 1 and viewed in the direction of the arrow.

Figure 3 is an enlarged view in sectional elevation of one of the similar filter bags a portion of which is broken away, this view which is taken at the section line 3 on Fig. 2 and viewed in the direction of the arrow showing details of the means for securing the bag in place at its upper and lower ends.

Figure 4 is a plan sectional view taken at the line 4 on Fig. 3 and viewed in the direction of the arrow; and Figure 5, a bottom plan view of the structure shown in Fig. 3.

Figure 1:
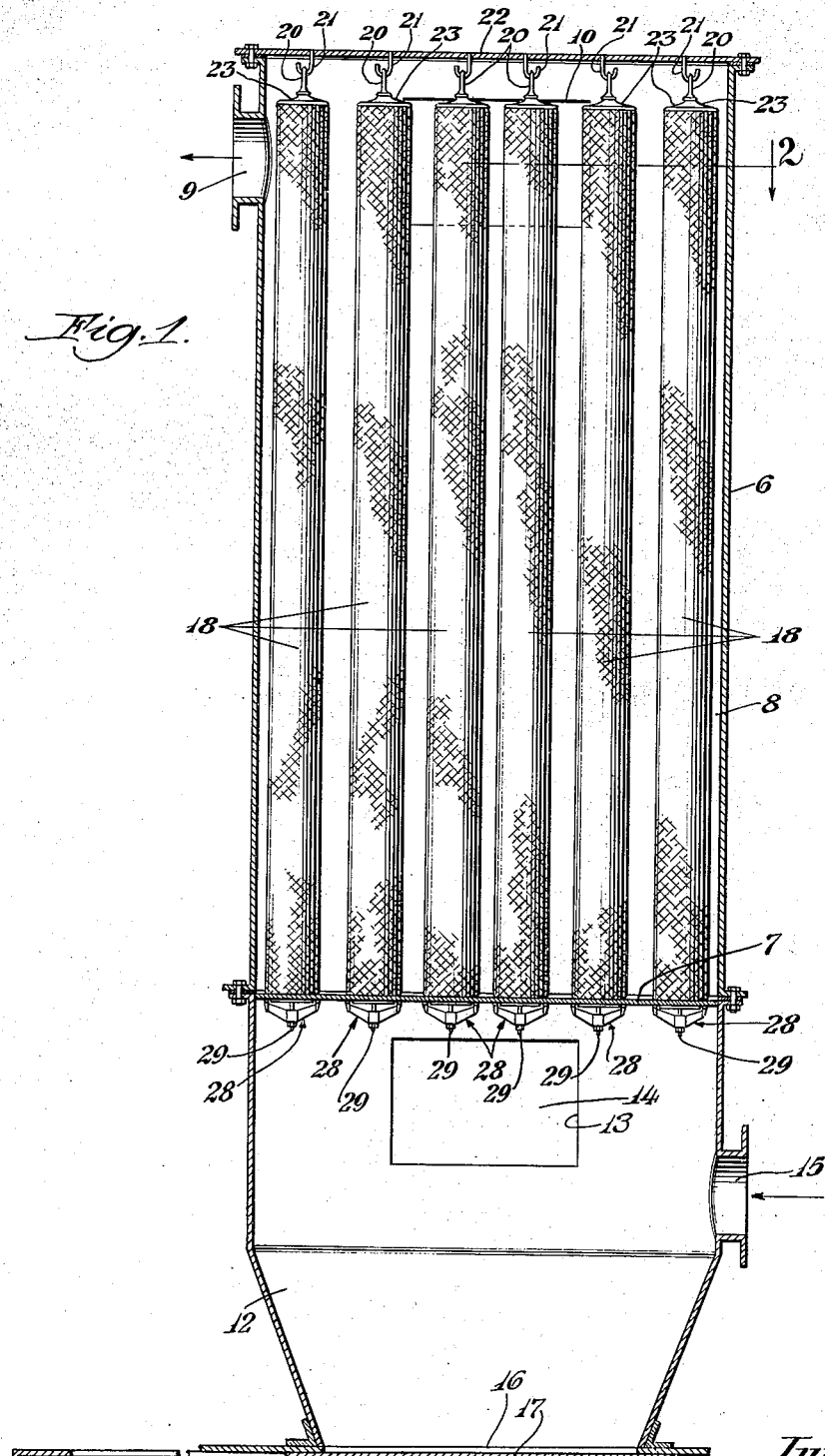
Figure 1 is a view in sectional elevation of a bag-filter-apparatus embodying my invention.

I have chosen to illustrate my invention as embodied in a well known type of dust filter comprising a vertical cylindrical shell 6 containing a substantially horizontal partition 7 in the form of a plate dividing the shell into an upper air-chamber 8 having an air outlet 9 and manholes 10 in its side wall spaced apart at any suitable intervals and equipped with removable and replaceable closures 11, and a lower hopperlike dust collecting chamber 12 having manholes in its side wall, one of which is shown at 13 spaced apart at intervals and provided with removable closures the one of the closures for the manhole 13 being indicated at 14. The chamber 12 communicates at 15 with the conduit (not shown) through which the dust-laden air to be filtered is delivered to the filter, the chamber 12 having an outlet 16 at its bottom for the collected dust and shown as controlled by a slide valve 17 represented in the drawings in closed position.

The apparatus also comprises tubular dust bags 18 which may be of any suitable material, such as for example fabric woven or sewn into a tube, these bags extending substantially vertically and parallel in spaced relation to each other in the chamber 8—in accordance with my invention in closely spaced relation—the bags 18 being supported at their ends in the chamber 8.

The plate 7 contains apertures spaced apart according to the desired spacing of the bags, one of these apertures being shown at 19, and the bags are connected with the plate 7 at its apertured portions 19, as hereinafter described, to produce air and dust-tight joints.

The connections of the bags 18 at their upper ends with the shell 6 are made in any suitable way, as for example by providing the tops of the bags with eyes 20 at which they may be engaged with hooks 21 depending from the top plate 22 of the shell, in accordance with the desired spacing of the bags relative to each other.

In the apparatus shown the eyes 20 are provided on the upper disk sections 23 of sectional clamps, the lower disk sections of which are shown at 24, and by the use of clamp screws 25, serve to clamp the upper rims of the bags 18, preferably provided with annular resilient gaskets 26, against the upper clamp sections 23 to make tight joints between the sections 23 and 24 and the bags 18.

In accordance with my invention the means for making air and dust-tight joints between the lower ends of the bags 18 and the plate 7 are of such character that they may be manipulated, to produce such joints or to release the bags from the plate 7 for removal from the chamber 8, as desired, from below the plate 7, thereby avoiding the necessity of the workmen entering the air chamber 8.

In the form shown these means comprise clamps for each bag 18, each clamp being formed of an upper, circular clamp section 27 apertured as by making it of spider form, as for example as shown, a lower clamp section 28, and a draw bolt 29 extending through the sections 27 and 28 and having a head 30 on its upper end and a nut 31 screwing onto its lower end.

The section 27, of tubular form, with a central cross bar 32 through which the bolt 29 extends, depends through the lower end of the bag 18 and the adjacent aperture 19 in the plate 7 and is provided with an outwardly extending annular flange 33 at its upper end at which the section 27 overlies an inwardly extending annular flange 34 on the lower end of the bag 18 and at which flange the bag bears against the plate 7, the flange 34 on the bag 18 preferably being provided with an annular flexible gasket 35, as for example of soft rubber, over which the marginal edge of the tube from which the bag 18 is formed, is folded as shown and stitched in place as represented at 36.

The bar 32 is centrally apertured at 37 to receive the draw bolt 29, the upper portion of the aperture 37 opening into a square recess 38 in the upper side of the bar 32 into which the head 30 of the bolt extends and is held from turning.

The section 28 is shown as formed of a bar portion 39 having a central aperture for the bolt 29, with outwardly directed lugs 40 at its ends adapted to bear against the under surface of the plate 7 at diametrically opposed sides of the adjacent one of the apertures 19, the nut 31 bearing, through the medium of a split washer 41, against the underside of this section.

As will be understood from the foregoing, tightening the nut 31 at the underside of the plate 7 and accessible to a workman through one of the manholes 13, draws the section 27 tightly against the flange 34 of the bag 18 forcing this flange firmly against the upper surface of the plate 7, and the section 28 firmly against the underside of the plate 7, thereby producing the desired tight joint between the bag and the plate and requiring, for the disconnecting of the bag from the plate, merely the removal of the nut 31, thus avoiding the necessity of the workman entering the chamber 8 containing the bags 18, to disconnect from the plate 7 the lower end of any of the bags to be removed and thereby permitting the bags to be spaced in the chamber 8 as closely as desired for the economical production of the apparatus.

In removing a bag from the filter the operator would disconnect the bag from the plate 7 as explained and then, through one of the manholes 10 in the wall of the chamber 8, disconnect the bag at its upper end from the one of the hooks 21 with which it is engaged and then draw the bag, together with the upper clamp section 27 and the bolt 29 therein, from the chamber 8.

The withdrawn bag is replaced or another substituted for it, by inserting a clamp section 27 with its draw bolt 29, into the bag to rest on the bag flange 34 and then positioning the bag on the plate 7 to register the bag and the clamp section 27 and its draw bolt 29 with the aperture 19 with which the withdrawn bag registered; and the bag then hooked over the hook 21 above this aperture.

The operator then applies the lower clamp plate 28 to position and clamps the bag to the plate 7 by applying the washer 41 and nut 31 to the draw-bolt 29 and tightening the nut from below the plate 7.

While I have illustrated and described a particular embodiment of my invention I do not wish to be understood as intending to limit the invention thereto as the structure shown may be variously modified and altered and the invention embodied in other forms of structure without departing from the spirit of the invention.

What I claim as new and desire to secure by Letters Patent, is:

1. In a filter comprising a shell having a chamber into which the filtered fluid discharges provided with an end wall having apertures therein and filter bags in said chamber in communication at one end with said apertures, means for securing said ends of said bags in registration with said apertures comprising clamps each having two sections one of which secures the edge of the bag to make a tight-joint between the bag and the inner side of said wall and the other of which clamps against the outer side of said wall, and means accessible from the outside of said wall for clamping said sections in position.

2. In a filter comprising a shell having a chamber into which the filtered fluid discharges provided with an end wall having apertures therein and filter bags in said chamber in communication at one end with said apertures and having gaskets secured to the edges of the open ends of the bags, means for securing said ends of said bags in registration with said apertures comprising clamps each having two sections one of which secures the gasket-equipped edge of the bag to make a tight-joint between the bag and the inner side of said wall and the other of which clamps against the outer side of said wall, and means accessible from the outside of said wall for clamping said sections in position.

3. In a filter comprising a shell having a chamber into which the filtered air discharges provided with an end wall having apertures therein and filter bags in said chamber in communication at one end with said apertures, means for securing said ends of said bags in registration with said apertures comprising clamps each having two sections, one of which is insertable to clamping position from the interior of said chamber and secures the edge of the bag to make a tight-joint between the bag and the inner side of said wall and the other of which clamps against the outer side of said wall, and means accessible from the outside of said wall for clamping said sections in position.

4. In a filter comprising a shell having a chamber into which the filtered fluid discharges provided with an end wall having apertures therein and filter bags in said chamber in communication at one end with said apertures, means for securing said ends of said bags in registration with said apertures comprising clamps each having two sections one of which secures the edge of the bag to make a tight-joint between the bag and the inner side of said wall and the other of which clamps against the outer side of said wall, and a draw bolt connecting said sections together and accessible for manipulation from the outside of said wall.

5. In a filter comprising a shell having a chamber into which the filtered fluid discharges provided with an end wall having apertures therein and filter bags in said chamber in communication at one end with said apertures, means for securing said ends of said bags in registration with said apertures comprising clamps each having two sections one of which engages said end of the bag inwardly of the outer surface of said wall and the other of which clamps against the outer side of said wall, and means accessible from the outside of said wall for clamping said sections in position.

6. In a filter comprising a shell having a chamber into which the filtered fluid discharges provided with an end wall having apertures therein and filter bags in said chamber in communication at one end with said apertures, means for securing said ends of said bags in registration with said apertures comprising a clamp element engaging said end of each of said bags, at least portions of said clamp elements being located inwardly of the outer side of said wall, and means accessible from the outside of said wall for engaging said clamp elements and drawing them and said bags in a direction away from the interior of said chamber to secure said ends of the bags in place.

RAY W. WILLIAMS.